June 16, 1964  R. F. ROSE  3,137,212
MACHINE CONTROL SYSTEMS
Filed May 29, 1961  5 Sheets-Sheet 3
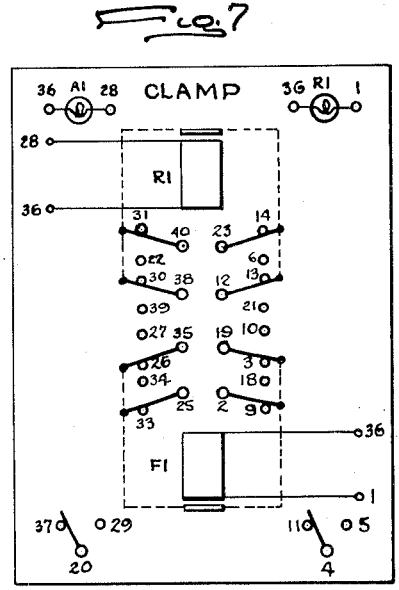
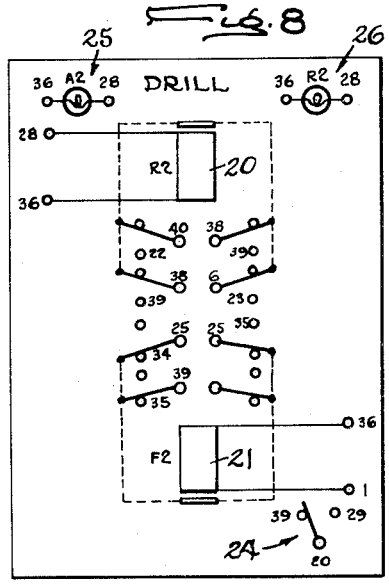
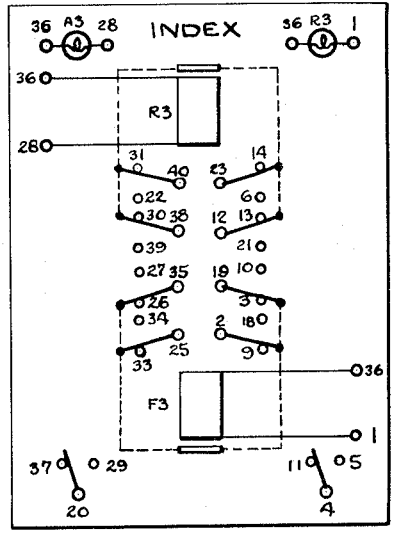
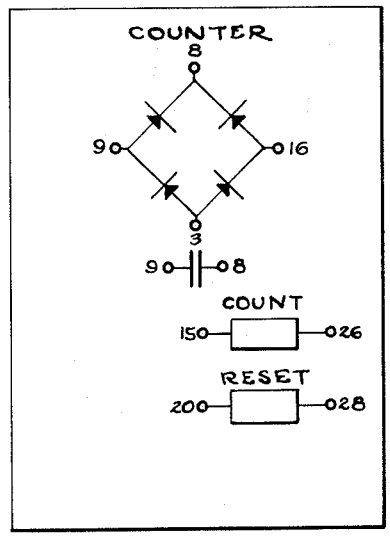

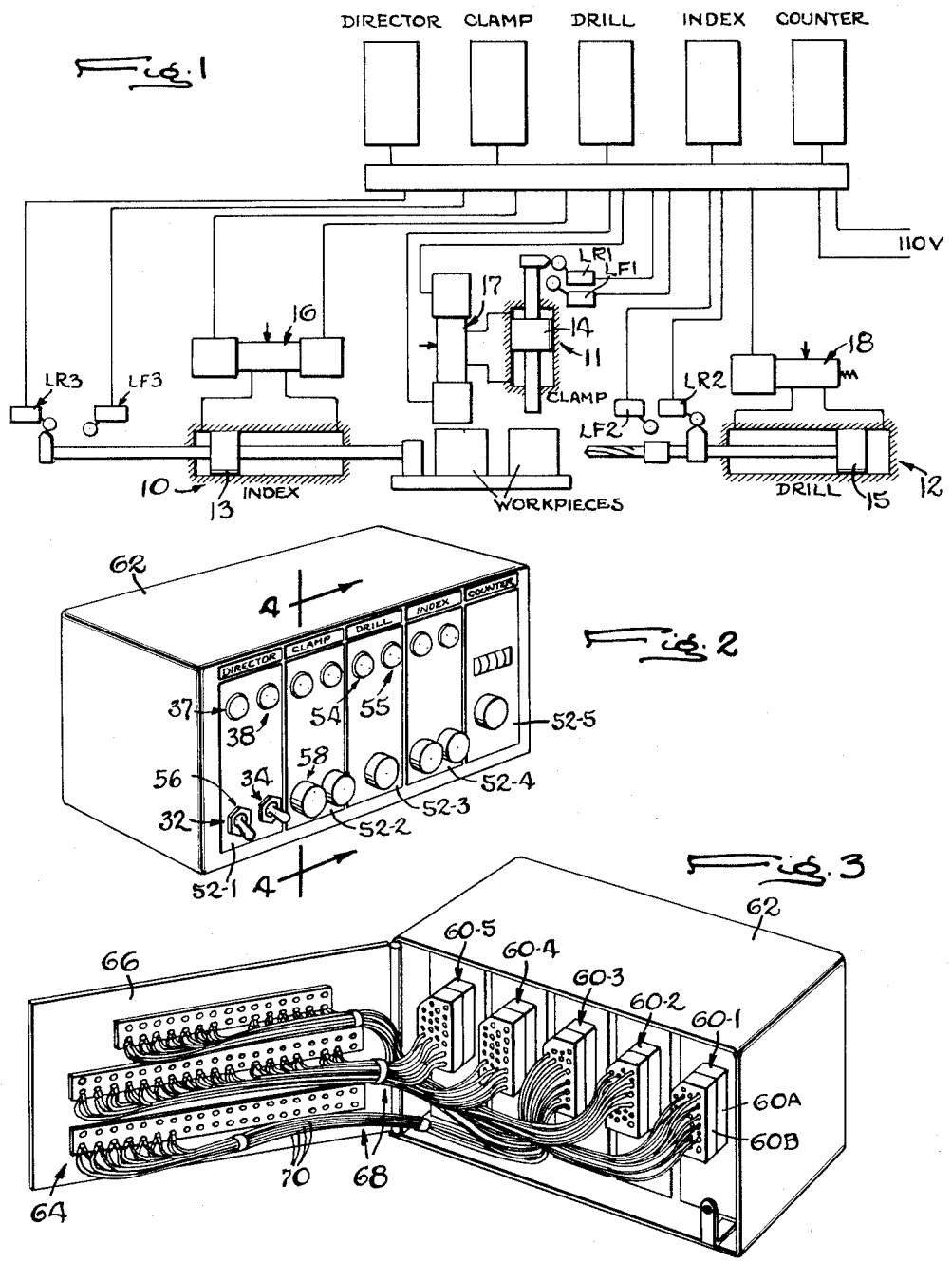

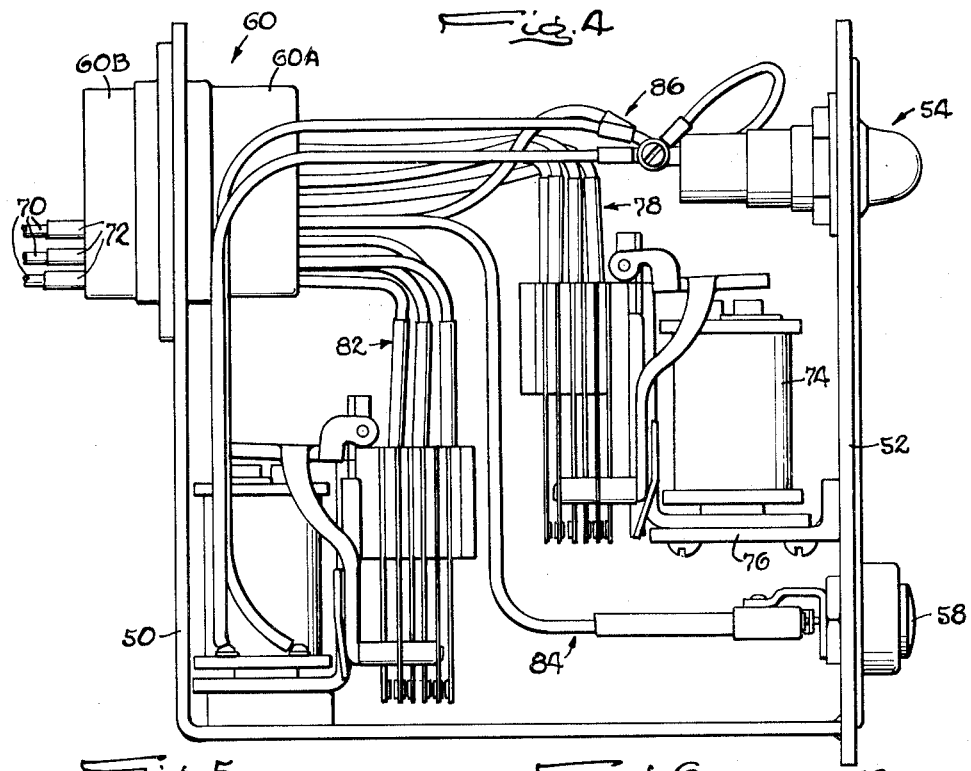
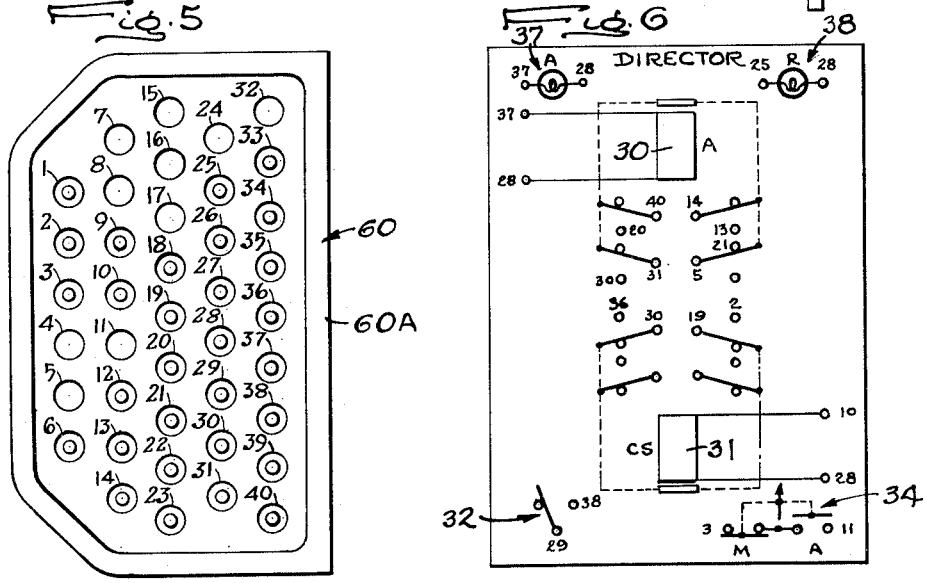

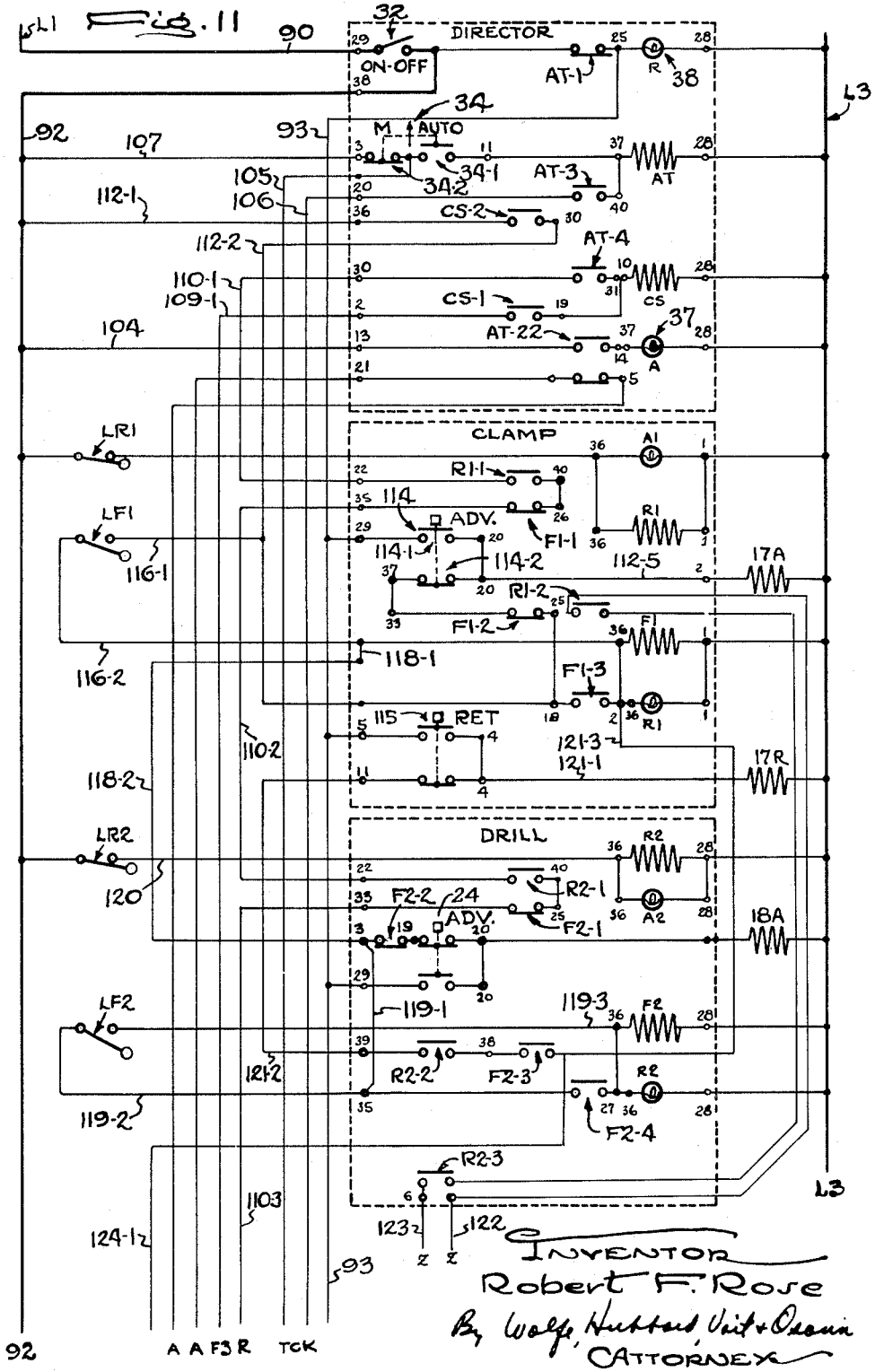

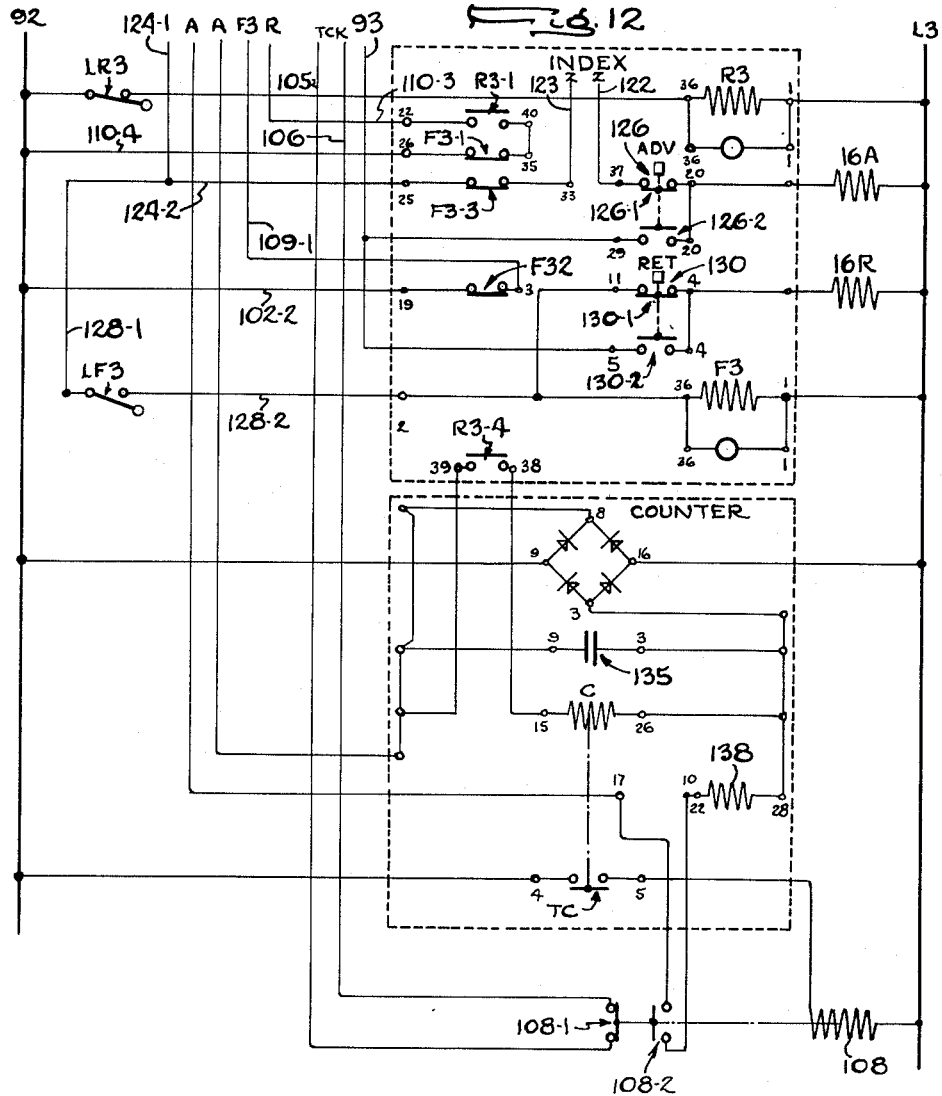

United States Patent Office 3,137,212
Patented June 16, 1964

3,137,212
MACHINE CONTROL SYSTEMS
Robert F. Rose, Rockford, Ill., assignor to Dixon Automatic Tool, Inc., Rockford, Ill., a corporation of Illinois
Filed May 29, 1961, Ser. No. 113,394
10 Claims. (Cl. 91—189)

This invention relates to machine controls and more particularly to multi-relay control circuits and their design for machines with motion producing components having automatic cycles.

In the design procedure commonly followed heretofore in the design of control circuits or systems for automatic sequence type machinery, the control engineer systematically builds each new circuit using logical methods to choose circuit components for performing each control function in proper sequence in the machine cycle. Since this is primarily a matter of electrical circuit design, such a design procedure requires highly skilled and experienced engineers even where relatively simple control circuits are involved. With complicated control circuits, design becomes very time consuming even for highly skilled and experienced personnel.

It is now proposed to provide a design procedure with apparatus to carry this procedure into effect which involves segregating the different basic motions of the machine cycle for which the control is designed, and providing a separate, functionally designated control section for controlling each basic motion. With this procedure the same design approach is followed for every control system and the design even of relatively complicated control systems becomes greatly simplified. Hence such systems may be designed in a much shorter time. While the method will be disclosed in connection with a specific preferred embodiment pertaining to the design of multi-relay control circuits for automatic sequence type machinery, it will be understood that the method and procedure is applicable more broadly to the design of control systems using other devices for performing the same logic functions as relays and for other types of machines.

One of the objects of the invention is to provide for the standardization of control systems for automatic machines by using separate, functional units for assembling the total control system for any machine having automatic cycles of motion producing components. A related object is to provide a set of functionally designated units for handling substantially all the possible machine cycles.

Another object is to provide a new method by which control systems may be designed. A related object is to provide a master circuit for use in the design of control system units, which master circuit readily accommodates variations to provide for special control functions so that control systems may be designed for a large variety of different machines.

Still another object is to provide separate, functionally designated units or circuit sections for controlling the basic motions of machine components, each unit having all the requisite electrical elements connected to a receptacle providing access to the elements and also having controls and indicators for the associated component to the end that such units may be assembled together in one enclosure, readily interconnected to each other to assemble the complete system, and thereby provide a relatively compact single enclosure serving as the machine control panel.

Another object is to provide for selective electrical connection to individual components of each unit or circuit section of an assembly and between components of separate units for setting up a control circuit. A related object is to provide complete interchangeability between units with the same construction.

Another object is to reduce the time and cost and to simplify the assembly of units into control systems by providing a simplified means of connection between the units.

Further objects will appear from the following description taken in connection with the accompanying drawings, wherein:

FIGURE 1 is a schematic view and block diagram of a machine control system constructed as a preferred embodiment of the present invention;

FIG. 2 is a perspective view of a control station in the form of a single enclosure assembled with units constructed in accordance with the invention;

FIG. 3 is a perspective view looking at the rear of the enclosure shown in FIG. 2, with the hinged back panel swung away to reveal the terminal board and plug-in connections to the units;

FIG. 4 is a view in side elevation of one of the units;

FIG. 5 is a view of the receptacle of a unit with the terminal locations numbered;

FIG. 6 is a schematic diagram of a director unit constructed according to the invention with the component terminals numbered to correspond with the receptacle terminals and according to the circuit schematic diagram of FIG. 11;

FIGS. 7-10 are schematic diagrams of standard units constructed according to the invention with the component terminals numbered to correspond with the receptacle terminals and according to the schematic circuit diagram of FIGS. 11 and 12;

FIGS. 11 and 12 connected in vertical edge-to-edge relation comprise a schematic wiring diagram of a control system shown in block diagram in FIGURE 1.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

I. GENERAL METHOD CONSIDERATIONS

Upon more specific reference to the drawings, it will be seen that the invention is applied to control apparatus for automatic sequence type machinery. Illustratively, the invention is applicable to all types of machines having a plurality of components such as rotary spindles, tables, clamps or other elements which have feed and return movements in certain sequence to carry out the machine operation without mechanical interference. Generally, the control system for a machine provides means for controlling the start, stop and cycle of operation of each of a plurality of motion producing components. Such motions may be linear, with forward and return strokes, or angular with the completion of 360° of movement representing a full cycle. To this end, as illustrated more particularly in FIGURE 1, which comprises an overall schematic representation of a preferred form of control apparatus, the different motion producing components, herein shown at the bottom of the figure as hydraulic cylinders 10, 11, 12 with pistons 13, 14, 15 for advancing and returning a machine element, are actuated by solenoid valves 16, 17, 18 controlled by individual segregated control circuit sections each including all parts of a functional circuit. The motion producing elements in this case are shown as cylinders 10, 11, 12 and are actuated by solenoid valves 16, 17, 18 directly controlled by relay contacts of the associated functional circuit, however, it will be recognized that the circuit output may be applied to directly control other transducers for piloting the supply of electrical or pneumatic power to the machine components. It is also contemplated that other types of switching devices may be employed, such as static magnetic systems or transistor switching.

A. Master Circuit

It has been observed that with automatic sequence type machinery most machine components involve the same basic motion, for example, advance and return linear motion of a hydraulic piston, or variations of this basic motion. In applying the design procedure or method of this invention to produce the control apparatus of FIGURE 1, a master circuit has been developed for controlling such advance and return motion and which by suitable modification is capable of producing outputs to directly control most variations of such basic motion. According to this invention, standard units have been evolved providing all electrical elements required to wire this master circuit in the form of compact, unitary, completely wired assemblies each having a receptacle providing convenient means for connection to the electrical elements and manual controls and visual indicators also connected to the receptacle of each unit. A standard unit in most simplified form (FIG. 8) includes a pair of relays 20, 21 for controlling machine component advance and return motion, respectively, each relay having a plurality of sets of contacts shown numbered in FIG. 8 according to the receptacle terminal to which they are connected. Such unit also includes manual switch means 24 for the relays, and lamps 25, 26 for indicating completion of the advance and return motions. How this simplified unit is modified to provide other standard units with electrical elements for assembly of circuits to control different motion variations is illustrated in FIGS. 6 and 7 which show in schematic form the elements of different units evolved from the first unit.

B. Standard Sections

(1) DIRECTOR SECTION

As above mentioned, the control system shown in block diagram in FIGURE 1 includes five sections including a common "director" section. A suitable standard unit providing electrical elements for the circuit of the "director" section, shown in schematic form in FIG. 11, is shown in FIG. 6.

This unit includes in addition to two relays 30, 31, a single throw switch 32 used for power control purposes and a second switch 34 used for sequence selection. Such unit also includes lamps 37, 38 associated with the switch 34 to indicate visually the position of the switch. Such unit further has a receptacle 60 having a plurality of terminals, herein shown as a total of forty terminals in FIG. 5, which is a view looking at the half 60A of the receptacle 60 fixed to the unit frame. Each receptacle 60, for wiring convenience has separable halves 60A, 60B with the inner half having the terminals numbered as in FIG. 5. To these terminals the contacts of switches 32, 34, relay coil terminals 30–1 and 31–1, and lamp terminals 37–1, 38–1, are connected. The electrical element terminals of the unit are connected to the receptacle terminals as indicated by the numbers in FIG. 6 which correspond to the receptacle terminal numbers in FIG. 5. Pins (not shown) extending from the separable half 60B of the receptacle project into the openings in the fixed half 60A, visible in FIG. 5.

(2) DRILLING

A standard unit is used to assemble the control system "drill" section which functionally directs advance and return motion, illustratively, of a rotary drill spindle. This unit is shown in FIG. 8 and includes a "forward" relay 20 and a "return" relay 21 as well as a pushbutton operated switch 24. Indicating lamps 25, 26 are also included to show the completion of the advance and return motions of the machine component. Cylinder control is served by a single solenoid valve 18 having a spring return when the solenoid is deenergized. Reference may be made to FIG. 11 for circuit details of a control system with such a standard unit. It will be understood that the standard unit used in assembling the "drill" circuit section is the simplified unit, the number two unit of the eight exemplary standard units later described.

(3) CLAMPING AND INDEXING

On the other hand, different standard units are selected for controlling advance and return motions of the indexing and clamping pistons 13, 14. In the event of power failure, or if the on-off switch is turned "off" during those portions of the machine cycle while either the indexing piston or the clamping piston is in the course of its advance stroke, and before the stroke is carried far enough to trip the associated limit switch, it is usually desired to make provision for completion of the stroke despite the loss of power. In other words, it may be desired to prevent partial sequence if power failure occurs. It will be understood that with cylinder control served by a single solenoid valve of the spring return type shown, for example, actuating the drill cylinder 12 (FIGURE 1), in the event of loss of power the valve solenoid immediately retracts and returns the piston. Should such occur with the drill cylinder, no damage will result because with the new cycle picking up where the previous was broken off the drill will be run down to the bottom of the partially completed bore and then will continue the drilling operation. In the case of the indexing operation or the clamping operation, however, to prevent damage to the work, jamming, or indexing of undrilled pieces, cylinder control will be served by means of a two solenoid valve or equivalent device. A two solenoid valve requires separate signals for energizing the separate solenoids. A standard circuit for controlling a two solenoid valve comprises one of the eight standard circuits mentioned in a later section. The circuit details of two such standard units incorporated in an illustrative control system for two solenoid valves controlling indexing and clamping cylinders, is shown in FIGS. 11 and 12. The interconnections between such standard units will be described in detail in a subsequent section.

(4) COUNTING

Another standard section, not a control section but a "counter," is shown in FIG. 10. This "counter" unit may be provided for furnishing a direct count of finished workpieces, or for any other similar function. The details of a suitable "counter" section circuit are also given in FIG. 12.

(5) OTHER STANDARD SECTIONS

Other standard units may be provided. For example, a unit for controlling advance and return motion as shown in FIG. 8 may be modified by adding an additional on-off switch to provide means for assembling a circuit to control energization or deenergization of the unit to suit the requirements of a particular machine control system.

This same unit for controlling simple advance and return motion (FIG. 8) may be further modified by the substitution of relays with a mechanical latch to suit control applications where once energized the relays must remain mechanically latched in, in the event of power failure, for example, until a subsequent unlatching signal is provided.

A further unit may be provided by modification of the unit shown in FIGS. 7 and 9 adapted for control of a two solenoid valve, by the substitution of relays with the mechanical latch feature to suit particular control applications. Such unit will be provided with separate pushbuttons for manual operation of each relay in a similar manner to the unit shown in FIGS. 7 and 9.

Thus eight different units may be readily made to provide means for assembling circuits for controlling different motions of machine components, to satisfy positive electrical interlocking and sequence specifications, or to provide further modifications and options as desired; the eight units are as follows: (1) a "director" section; (2) the simple advance and return motion unit of FIG. 8; (3) the advance and return motion unit for controlling two solenoid valves as shown in FIGS. 7 and 9; (4), (5) two further modifications of these units obtained by adding on-off selector switches for energizing the individual units; and (6), (7), (8) the three further units obtained by substituting mechanical latching relays for electrical latching relays. It will be further understood that separate units may be provided for special control purposes, such as counting, feeding, etc. Such units might also provide extra pushbuttons or might provide auxiliary relays to be connected to and operated from any section where additional switching is needed.

II. STEPS IN CONTROL SYSTEM DESIGN

In accordance with the design procedure of this invention, the machine cycle is first analyzed and its motion producing components segregated. The motion of each component is then considered and assigned a standard functional designation according to a set of such standards. As noted above, a set of eight standard sections are readily provided to serve this purpose. The sequence of operation is then determined depending upon mechanical interference between each component and the machine cycle. Also, the character of the cycle is decided upon. The cycle may be fully automatic wherein each cycle, after the first one, will be initiated automatically without manual intervention. Other options include semi-automatic cycling wherein each cycle is required to be manually started but will be completed automatically, and automatic-manual cycle whereby selective pushbutton control of either fully automatic or fully manual operation is obtained.

Next, the special functions for that particular machine are considered; functionally designated units are available for inclusion in the control system for performing special functions such as counting, vibratory feeding, timing and stepping switching, which are operations other than involved in the control of the simple, basic motions.

The steps of machine cycle breakdown, sequence selection and special function designation are carried out for each control system design before any actual circuit assembly is started. In effect, a functionally designated circuit section is selected for each motion of the machine cycle and the special circuit sections or special functions are also selected by this logical process. After the sections have been selected, the connections between sections are schematically diagrammed including a common director section with feed-back from the individual sections to provide the assigned cycle and sequence and to include manual controls for starting and stopping the cycle and the operation of the machine.

III. SPECIFIC APPARATUS EMBODIMENT

A. Machine Cycle

The table below illustrates a simplified sequence of basic motions of components of an automatic drilling machine set up for drilling a workpiece. Hydraulic cylinder operated components of the machine, as schematically illustrated in FIGURE 1, include a clamp, a rotary drill and a workpiece indexing device. These hydraulic cylinders are the motion producing components.

| Component | Forward | Return |
| --- | --- | --- |
| Clamp | 1 | 4 |
| Drill | 2 | 3 |
| Work Indexing | 5 | 6 |

For simplicity, a fully automatic cycle has been shown in which after the piece is drilled, the clamp is released and the piece is indexed from the "drilling" position. On the same advance stroke of the indexing device which conventionally includes a ratchet mechanism, a new piece is indexed to "drilling" position; the index piston 13 is returned immediately and cocks the mechanism for the indexing step of the succeeding cycle. Succeeding cycles are automatically initiated. Considering the example shown, before the start of the first cycle, the clamp is open and the drill spindle is retracted. A piece is inserted in the clamping mechanism manually and the start of the cycle is marked by the advance of the clamp piston 14 to clamp the piece in place. The clamp piston 14 must be latched in its advanced position until the drill has been advanced and returned and the drilling operation has been completed, after which the clamping cylinder piston is returned to open the clamp. The indexing piston 13 is then advanced to index the old workpiece and transfer a new workpiece into the clamping apparatus. The indexing piston 13 is retracted to complete the cycle. Furthermore, as a matter of sequence specification the advance of the clamp piston 14 must be completed before the drill spindle piston 15 is advanced, and the drill spindle advance and return strokes must be completed before the clamp is opened and the indexing operation carried out. Thus the cycle involves six steps as indicated by the table with the steps carried out in the sequence shown.

In choosing standard units, therefore, to prevent partial sequence if power failure occurs the index cylinder 10 and the clamp cylinder 11 will be operated by two solenoid valves. Hence, the standard unit number three, as set forth in the previous section, will be assigned for control purposes to these cylinders 10, 11 for indexing and clamping while standard unit number two will be used for the drill cylinder 12. The foregoing description of the cycle with considerations to prevent mechanical interference between the clamp and indexing operations, and the drilling operation, will determine how these standard units are interconnected. As a further matter of specification, the machine cycle will be fully automatic to achieve automatic indexing of new pieces for drilling each cycle of operation.

B. Control System Organization

Referring to FIGURES 1, 11 and 12, these figures depict a control system constructed with standard control units of the present invention including a common "director" section and a plurality of individual control sections (clamp—drill—index) for the hydraulic motion producing elements of the machine, respectively. A "counter" section is also provided. The "director" section (FIG. 11) provides manually operated switches 32, 34 for starting the machine and the cycle of operation, and receives feed-back information from the individual control sections for governing the operational sequence. Each of the "clamp," "drill" and "index" circuit sections operates solenoid valve means 16, 17, 18 (FIGURE 1) for controlling the supply of pressure fluid to the respective hydraulic cylinder. In this manner, a control system is provided which may be assembled with the standard units of the invention. These units are assembled in a common enclosure, shown in FIGS. 2 and 3, and interconnected according to the schematic wiring diagram of FIGS. 11 and 12.

C. Panel Assembly of Standard Units

As shown in FIG. 4, which illustrates one standard unit of the type for controlling a single solenoid valve, with wiring connections as shown, for example, in FIG. 8, each such unit includes an L-shaped mounting frame 50 to which the various electrical elements are fixed. A front plate 52 is fastened to the frame as by welding or the like. This front plate is rectangular, as shown in FIG. 2, and serves as a control panel section having at the top the indicating lamps 54, 55 for the relays of the unit, and at the bottom the switch actuating elements which may be fingerpieces 56 or pushbuttons 58. At the back of each unit fixed to the L-shaped frame is a single multi-terminal receptacle 60 to the terminals of which the electrical elements of the unit are connected.

A plurality of such units may be assembled in a single enclosure 62, as shown in FIGS. 2 and 3, with the front plates 52–1 to 52–5, which are of the same size and shape, in side-by-side relation thus providing a control panel and pushbutton station. As shown in FIG. 3, the receptacles 60–1 to 60–5 for all the units making up the system are aligned across the back of the enclosure 62 and readily accessible for connection to a terminal board 64 which is fixed to a rear panel 66 hinged to the enclosure 62. The terminal board 64 is connected to the receptacles 60 of the different units by a wiring harness 68 made up of bundles of flexible connectors 70 ending in plugs 72 (FIG. 4) which are inserted in the receptacles 60 according to the connections made between the units as specified in the schematic wiring diagram of FIGS. 11 and 12. For wiring convenience, as above noted, each receptacle 60 has separable halves with the outer half 60B removable with its wires 70. The receptacle terminals are numbered as shown in FIG. 5, which numbering system is used in the views of the different standard units of FIGS. 6 through 9, functionally designated according to the machine component with which they are associated in the illustrative control system.

With further regard to FIG. 4, it will be seen that each unit has one relay 74 mounted in the forward portion of the unit behind the front panel 52, as by means of a bracket 76. In the present case, this comprises the "forward" relay in any one of the "clamp," "drill" or "index" units, and the terminals of its contacts are wired to the upper terminals of the receptacle 60 by insulated conductors 78. Each unit has a second relay mounted below the receptacle 60 in the back of the unit and comprising the "return" relay on any one of the "clamp," "drill" or "index" units and the terminals of its contacts are connected by insulated conductors 82 to the lower group of receptacle terminals.

The switches mounted on the front plate 52 are connected to intermediate terminals of the receptacle 60 by means of conductors 84. The indicating lights, only one of which (54) is visible in FIG. 4, are connected to the respective relays, and also to receptacle terminals by conductors 86. For illustrative purposes, the forward indicating lamp 55, which is lit when the controlled device has completed the advance stroke, is the right-hand lamp on the front of the panel as viewed in FIG. 2, while the indicating lamp 54 on the left, the return lamp, is lit to show that the controlled device has returned. Thus the electrical elements of the standard unit are connected by conductors 78, 82, 84, 86 to a random arrangement of terminals of the receptacle 60 and these connections are unscrambled by means of the wiring harness 68 which connects the individual electrical elements of all units to the terminal board terminals for interconnection of such elements in all units and connections for control purposes to the controlled devices, herein shown as solenoid valves 16, 17, 18. It will be noted from FIGS. 6–9 that some but not all elements are connected to receptacle terminals in some cases.

As herein shown, for convenience in assembling and removing standard units, the receptacles 60 are constructed using separable halves with the wiring harness conductors 70 joined to one receptacle half 60B (the female half) and the conductors 78, 82, 84, 86 in the unit joined to the other receptacle half 60A. The plugs 72 on the ends of the harness conductors 70 are inserted into receptacle openings selected by number to establish electrical connection to selected unit elements.

With all standard units being the same and the wired circuit elements thereof connected to the same numbered receptacle terminals, a unit of a set making up a control panel enclosure such as shown in FIG. 4 may be removed and replaced by a new unit simply by joining the receptacle half 60B left dangling by its harness conductors 70, to the receptacle half 60A fixed to the new unit. The correct circuit connections are thus automatically established in the new unit.

Using the standard units, a complete control system may be assembled. With each standard unit, of all types, being the same size and general outward appearance, a combined panel and pushbutton station may be assembled which will serve all control functions for the automatic sequence type machine for which the control system is intended. The units are fully interchangeable. If, for example, one unit of a system malfunctions, it may be replaced with a similar standard unit reducing down time. The old unit, when repaired, may serve as a spare or may be reinserted in the panel enclosure. Complete standardization of controls for all machines in a plant of a manufacturer's line, or of a group of machines, may be provided using the standard functionally designated components of the invention.

D. Control System Schematic Diagram

Referring now to FIGS. 11 and 12, such together comprise a schematic wiring diagram for the control system shown in block diagram in FIGURE 1. Thus the system includes a common "director" section and a plurality of individual control sections, "clamp," "drill" and "index," as well as a "counter" section.

It will be understood that each section has a pair of relays and such relays of the control sections: clamp, drill and index, are used to control the advance and return motions of the clamp piston 14, drill piston 15, and index piston 13 via solenoid valves 17, 18, 16, respectively. For convenience, the relays of each such section will be designated in the drawings F (forward) or R (return) according to the control function performed. The forward and return relays of the "clamp" section will be designated F–1, R–1, those of the "drill" section or "drill" unit F–2, R–2, and those of the "index" unit F–3, R–3. The contacts of such relays will be designated –1, –2, –3, etc.

Each control section, furthermore, is connected to a forward position responsive device and return position responsive device actuated by the associated machine component, herein shown as forward and return limit switches which will be designated LF1, LR1 for the clamp piston 14, LF2, LR2 for the drill piston 15, and LF3, LR3 for the index piston 13.

In order to connect power to the control system, the "director" section on-off switch 32 which is connected to a source of potential through the terminal 29 of the "director" unit receptacle 60–1, and the conductor 90, is turned "on" thereby energizing through the terminal 38 the main bus 92 which is connected to supply power to every control unit in the system and also through the terminal 25 to the bus 93 which provides power to the "manual" switches of every control unit in the system. After this on-off switch 32 in the "director" section is turned on, power is provided in all units of the control system through the bus 93 to allow manual operation of the machine components for setup or test purposes, for example. With the manual-automatic switch 34 in the "director" section shifted to the automatic position, power is removed from the bus 93 and the individual control units are supplied with power from the main bus 92.

With the system set for manual operation and the switch 34 on the manual position as shown, the red lamp 38 is energized through the normally closed relay contacts AT–1 of the "automatic" relay AT of the "director" section. The relay AT is deenergized with the automatic-manual select switch 34 in its manual position. To start an automatic cycle of machine operation, this switch 34, which may include separate sets of contacts 34–1, 34–2 operated by a common actuator, is shifted to its automatic position to momentarily close the "automatic" contacts 34–1 and thereby energize the relay AT, and to momentarily open and then reclose the "manual" switch contacts 34–2. With the relay AT energized, the red lamp 38 is unlit and the white lamp 37 is lit through the relay AT contacts AT-2, the terminal 13, and the connection 104 to the main bus 92. Another set of relay contacts AT-3 are picked up to seal in this automatic relay through the conductors 105, 106 which lead to the terminals 20 and 36, respectively, and to the main bus 92 through the manual-automatic switch 34, terminal 33 and conductor 107. Such conductors 105, 106 are connected in series through a set of normally closed switch contacts 108-1 of the counter solenoid 108 of the "counter" unit (FIG. 12). With this arrangement after the manual-automatic switch 34 is moved to its automatic position to energize the control system for automatic cycling, the manual contacts 34-2 of this switch 34 act as a stop switch which may be operated to open the circuit to the relay AT through the conductors 105, 106, 107 and the holding contacts AT-3 thereby deenergizing the relay AT and stopping the automatic cycling.

The relay AT of the "director" section also closes another set of contacts AT-4 in the circuit of a cycle start relay CS which is also in the "director" section. This latter relay CS serves the function of directing the start of each machine cycle and is in series for interlock purposes with contacts of each of the forward and return relays A-1 to A-3 and R-1 to R-3 in all three control units of the system (clamp—drill—index). These relay contacts comprise a starting lineup and must all be closed to energize the cycle start relay CS. Such relays in all units are shifted to a state in which the starting lineup contacts are closed at the completion of each cycle to energize the cycle start relay CS to start the succeeding sequence. With this arrangement, information as to the completion of each forward and return stroke of the machine components is fed back to the "director" section.

For this purpose, still referring to FIG. 11, the starting lineup includes relay contacts F1-1, R1-1 in the "clamp" section which are wired in series in the standard unit of the "clamp" section and to the receptacle terminals numbered 22 and 35. Note that the return relay contacts R1-1 are normally open while the forward relay contacts F1-1 are normally closed. Similarly, in the "drill" unit, sets of relay contacts F2-1, R2-1 included in the starting lineup are wired in series and to the receptacle terminals numbered 22 and 34. In the "index" unit (FIG. 12), the sets of relay contacts F3-1, R3-1 of the starting lineup are wired in series and to the receptacle terminals numbered 22 and 26. These relay contacts of all three control units are connected in series with the automatic relay contacts AT-4 in the "director" section through the terminal 30, to form the starting lineup, and to the main bus 92 through the terminal 26 of the "index" section (FIG. 12).

For illustration purposes, the terminals of the control units to which the contacts in the cycle start relay CS starting lineup are connected, are shown directly joined by sections of a conductor 110, however, in practice these connections will be made as shown in FIG. 3 via terminals on the terminal board 64 and flexible plug-in connections into the numbered terminals of the receptacles 60-1 to 60-4 of the units. One or a plurality of such terminal board terminals will, in effect, serve as the bus 92. This same convention is followed throughout the drawings.

Now turning to circuit of each control unit, as shown in FIGS. 11 and 12, each such control unit is connected to limit switches LF, LR actuated by the associated piston. Thus, for example, the clamp piston 14 closes a forward limit switch LF-1 at the completion of its forward stroke and closes a return limit switch LR-1 at the end of the return stroke. Regarding the "clamp" section, with the clamp piston 14 returned to the top of its stroke, the limit switch LR-1 is in its closed position as shown in FIG. 11 and the clamp is open as shown in FIGURE 1. In a similar manner with the drill piston 15 retracted, its return limit switch LR-2 is closed. Referring now to FIG. 12, the forward limit switch LF3 is operated by the index piston 13 and the return limit switch LR3 of the "index" unit is actuated by the index piston 13 as it reaches its return position, having indexed.

As noted above, to start the automatic cycle the first workpiece is manually positioned in the clamp; the final sequence step of succeeding cycles involves the return of the indexing piston 13 after the new piece is indexed into drilling position with the clamp open. All the starting lineup contacts will be closed; with the return limit switch LR-1 of the "clamp" unit closed, the return R-1 is energized to close the contacts R1-1 and the contacts F1-1 are normally closed; with the drill piston 15 retracted, the limit switch LR2 will be closed, energizing the relay R2 to pick up its contacts R2-1 in the starting lineup, and the forward relay contacts F2-1 are normally closed; with the "index" section piston 13 in the retracted position, the limit switch LR3 will be closed, energizing the return relay R3 and causing the later to pick up its contacts R3-1 in the starting lineup, and the forward relay contacts F3-1 again are normally closed; thus the starting lineup circuit to the cycle start relay will be closed to energize the latter from the bus 92.

With the cycle start relay CS energized, a set of its contacts CS-1 is picked up to seal in this relay through the terminal 2, the conductor 109-1 and the contacts F3-2 of the forward relay F3 in the "index" section (FIG. 12). Such contacts F3-2 are connected by a conductor section 109-2 and the terminal 19 to the bus 92 to provide power for the relays and will remain energized until the index position advance stroke is completed, marked, in the usual operation, by the closing of the forward limit switch LF-3 associated with the index piston 13.

With the "director" unit cycle start relay CS energized and sealed in, the machine cycle is started. The first motion is that of the clamp piston 14 to clamp the workpiece. For this purpose a second set of the cycle start relay contacts CS-2 (FIG. 11) are closed to actuate the "clamp" unit advance solenoid 17A of the solenoid valve 17. This will cause pressure fluid to be admitted from a source to the clamp cylinder 11 thereby advancing the clamp piston 14. The circuit to the solenoid 17A is via the schematic conductor 112. In actual practice, such connection would be made via the terminal board 64 using plug-in connectors. The advance solenoid 17A circuit includes the terminals numbered 18, 25, 33, 37, 20 and 2 of the clamp unit receptacle 60-2, the normally closed contacts 114-2 of the manual switch 114 of the "clamp" unit, and the terminals 30, 36 of the "director" unit receptacle 60-1.

With the solenoid valve 17 for the clamp so actuated, the clamp piston 14 will advance to the end of its stroke to clamp the workpiece for drilling, thereby closing the forward limit switch LF-1 and opening the return limit switch LR-1. It will be seen that closing the forward limit switch LF-1 will connect the bus 92 and source of potential to the forward relay F1 through the conductor sections 112-1, 112-2, 116-1, 116-2, and "clamp" unit receptacle terminal 36. It will be noted that the set of contacts F1-1 in the cycle start relay CS starting line will drop out, and further that when the clamp piston is returned in the fourth step of the cycle sequence, the same set of contacts F1-1 will be reclosed.

In the cycle of operation as noted above, the clamp remains closed until the "drilling" operation is carried out. Hence, the closing of the forward limit switch LF-1 also connects the power from the bus 92 through conductors 112-1, 112-2, 116-1, 116-2, 118-1, 118-2, to the circuit of the drill solenoid valve 18 in the "drill" unit via the receptacle terminal 33 of the "drill" unit. This latter circuit includes the normally closed contacts 120-1 of the manual switch 120 in the "drill" unit and the normally closed contacts F2-2 of the forward relay F2 of this unit. Actuating the drill cylinder solenoid 18A in this manner causes the drill piston 15 to advance to move the drill into engagement with the workpiece to carry out the drilling operation.

The drill piston 15 advances until it closes the forward limit switch LF-2. The return limit switch LR-2 shown as normally closed, is opened in the course of such drill piston movement.

When the forward limit switch LF-2 is closed by the action of the drill piston 15 in completing the drilling operation, the forward relay F2 of the "drill" unit is energized from the receptacle terminal 33 of this unit through the conductor sections 119-1, 119-2, 119-3. This circuit provides positive interlock with the "clamp" section through the conductors 118, 116, 112 and the clamp limit switch LF1. The forward relay drops out the relay contacts F2-2 in the circuit to the solenoid 18A of the drill cylinder valve 18. Since the latter has a spring return, the stroke of the drill piston 15 is immediately reversed to retract the drill from the workpiece, and the drill piston 15 is moved to its return position thereby closing the return limit switch LR2 and opening the forward limit switch LF2. With the return limit switch LR2 closed, the return relay R2 of the "drill" unit is energized from the bus 92 through the conductor 120, picking up its contacts R2-2 in the circuit to the return solenoid 17R of the clamp solenoid valve 17, to unclamp. The circuit to the return solenoid 17R includes conductor sections 121-1, 121-2, 121-3, the "clamp" unit forward relay contacts F1-3, and the conductor 112 which is energized from the main bus 92. Once the return solenoid 17R is energized, the solenoid valve 17 is shifted to its return position so that the subsequent opening of the "clamp" unit forward relay F1 and its contacts F1-3 in the energizing circuit to the return solenoid 17R does not affect the further operation of the solenoid valve. Another set of contacts R2-3 of the "drill" unit return relay R2 are in the circuit to the indexing valve advance solenoid 16A through conductors 122, 123 and start the indexing operation. Potential is applied to the advance solenoid 16A for the index cylinder valve solenoid 16 through the conductor 124-1, connected to the "drill" unit receptacle terminal 19, and the normally closed relay contacts F3-3 and switch contacts 126-1. The receptacle terminal 19 is energized with the drill piston retracted to interlock against mechanical interference.

As the index piston 13 reaches the end of the advance stroke, it closes the forward limit switch LF-3 thereby energizing the forward relay F3 again through the conductor 124 and deenergizing the advance solenoid 16A by opening the relay contacts F3-3. Power is supplied to the circuit to the return solenoid 16R through the limit switch LF3 to the conductor 128 and the normally closed contacts 130-1 of the manual switch 130 to the solenoid 16R.

Simultaneously with the actuation of the advance limit switch LF3 and the relay FS, a further set of contacts F3-1, in the holding circuit for the cycle start relay CS in the "director" unit, are dropped out to deenergize the cycle start relay CS. This relay CS will be energized to start the succeeding cycle when all the contacts of the starting lineup are closed, after the index operation. The starting lineup includes the normally open contacts R3-1 in the "index" unit, and such contacts will be closed when the index piston 13 has completed its return stroke to close the return limit switch LR3 to energize the return relay R3.

The "counter" unit of the control system in the present case provides means for terminating the automatic cycling after a preset number of workpieces have been drilled. For this purpose the dial on the counter panel may be set to the number desired. The counter is actuated each cycle to count back to zero and includes a contact TC which is mechanically actuated on the last count only, to pick up relay 108. When relay 108 is picked up, contact 108-1 is opened to deenergize the automatic relay AT in the "director" unit, and a second set of contacts 108-2 is closed to energize the counter reset coil 133. In the present case, each cycle count is registered by a set of contacts F3-4 of the "index" unit forward relay F3 which, when picked up, close the circuit through the count coil C. The condensor 135 is a filter condensor across a rectifier of the counter circuit, and across the condensor 135 which discharges the condensor 135 through the relay coil TC. A suitable conventional counter circuit is shown in FIG. 12.

The indicating lamps in each control unit, it will be understood, are effectively connected across the terminals of the forward and return relays so as to visually indicate whether the advance or the return motion of the component has been completed. Each unit has manual switches, for example, the switch 24 in the "drill" unit, for manually advancing the drill piston 15. Similarly, in the "clamp" unit there are separate pushbutton operated switches 114, 115 for actuating the advance and return solenoids 17A, 17R. In the "index" unit switches 126, 130 are included for manual-operation of the index piston.

While the schematic circuit diagram of FIGS. 11 and 12 illustrates a typical control system which may be assembled using standard units constructed according to the present invention, it will be understood that modifications in this system to provide additional interlocking or to vary the sequence may be achieved by merely using additional relay contacts provided in the units, or changing the connections between the units. Thus the units which are functionally designated, are assembled according to the sequence desired and with due consideration for interlocking to prevent interference between the machine components. The actual circuit layout using such units, following the method of this invention, involves easily mastered procedures and greatly simplifies control system design. Hence, control systems may be developed for all types of automatic sequence machinery and fully complete systems will be provided by use of the different standard units and the options and variations in actual circuit layout which become possible therewith.

It is to be noted, furthermore, that while the "director" unit in the illustrative case performs cycle and sequence control functions, and further has the power on-off switch for the control system, yet further functions may readily be performed by means of this "director" unit. For example, another switch may be added or the presently included on-off switch 32 connected to simultaneously operate motor relays for controlling the operation of motors of the machine. Other variations will be apparent.

Other advantages will be seen to flow from the present invention as described above. One of the principal features is in the method aspects of the invention wherein control system design is a step-by-step process involving function identification and functional unit designation according to the set of standard units which the invention provides, instead of involving primarily circuit design. By establishing the circuit elements in the form of a set number of standard units, circuit design becomes a relatively logical process involving selection of suitable standard units and identification of the connections between electrical elements of such units according to assigned sequence and cycle considerations. The information for carrying out the logical process may easily be placed in a form acceptable to an automatic computer, so that the actual design steps may be carried out by means of such a device.

I claim as my invention:

1. A method of assembling control means for a sequence type machine having a plurality of motion producing components operating in a predetermined sequence, and using a plurality of standard functionally designated units and a director unit, each unit having a pair of multicontact relays, comprising the steps of segregating the motion producing components of said machine into components each producing an advance and return motion; connecting a standard functionally designated unit to each machine component so one of each unit relays actuates the associated component to produce advance motion and the other relay actuates the component to produce return motion; interconnecting said functionally designated units so that said machine components operate in said predetermined sequence; and connecting a director unit to said interconnected functionally designated units so that each new machine cycle is initiated responsive to the completion of the previous machine cycle.

2. A control unit for use in assembling control means comprising: a front plate having a face; electrical elements mounted behind said front plate including a switch having an actuator extending forward from said plate face and contacts actuated by movement of said actuator, a multi-terminal receptacle having separable male and female halves with one of said receptacle halves carried by said unit behind and spaced from said front plate, and a plurality of relays each having multiple contacts carried behind said front plate between the latter and said receptacle; and conductor means electrically connecting contacts of said switch and relays to individual terminals, respectively, of said receptacle half carried by said unit so that conductors connected to the other receptacle half are elecerically connected to selected electrical elements of said unit by plugging the male half into the female half of said receptacle.

3. In combination with a plurality of motion producing elements of a machine, said elements operating in a predetermined sequence each machine cycle; position responsive devices operated by each element each machine cycle; control means comprising a plurality of separate interconnected units including a common director unit and individual control units for the motion producing elements, respectively; means connecting said control units to actuate said elements, respectively, in said predetermined sequence; means connecting each control unit to position responsive devices operated by the associated element for registering the completion of each operation in a sequence; and means connecting said director unit to said control units for initiating each machine cycle responsive to sequence completion signals fed back to said director unit.

4. A machine control means comprising, a plurality of control units each having a panel with a panel face, means defining an enclosure for said plurality of control units, means for mounting said control units in adjacent relation in said enclosure with said panel faces in substantially the same plane forming the front panel of said enclosure, a terminal board mounted in said enclosure, each said control unit having electrical elements behind the panel thereof including: a switch having an actuator extending from the panel face and contacts actuated by movement of said actuator, a multi-terminal receptacle behind the panel, a plurality of relays each having multiple contacts carried behind the panel adjacent said receptacle; and conductor means electrically connecting contacts of said switch and relays to individual terminals, respectively, of said receptacle, and means for interconnecting selected electrical elements of said control units to form an electrical control circuit including conductors connected to terminals of said terminal board and plugged into said receptacles of said control unit to contact selected terminals thereof.

5. A machine control means comprising, a plurality of control units each having a panel, means defining an enclosure for said plurality of control units, means for mounting said control units in adjacent relation in said enclosure with said panels in substantially the same plane forming the front of said enclosure, a plurality of electrical elements in each control unit behind the panel thereof, a multi-terminal receptacle in each unit having separable halves with one of said halves carried behind and spaced from said panel thereof, conductor means in each unit electrically connecting said electrical elements to individual terminals respectively, of said one receptacle half carried by the unit, a rear panel for said enclosure, a terminal board mounted on said rear panel, and means including conductors connected to terminals of said terminal board and selected terminals of the other halves of the receptacles of said units so that selected electrical elements of said control units may be interconnected to form an electrical control circuit by joining the halves of said receptacles.

6. A machine control means comprising, a plurality of control units each having a panel with a panel face, means defining an enclosure for said plurality of control units, means for mounting said control units in adjacent relation in said enclosure with said panel faces forming the front of said enclosure, a plurality of electrical elements in each control unit behind the panel thereof, a multi-terminal receptacle in each unit having a female half and a male half one of which halves is carried behind and spaced from said panel thereof, conductor means in each unit electrically connecting said electrical elements to individual terminals, respectively, of said one half thereof carried in said unit, a terminal board mounted in said enclosure, and means including conductors connected to terminals of said terminal board and selected terminals of said other receptacle halves so that selected electrical elements of said control units may be interconnected to form an electrical control circuit by plugging the male halves into the female halves of said receptacles.

7. In combination with a plurality of motion producing components of a machine, control means including a plurality of control units for said components, respectively, each unit having a panel, means defining an enclosure for said plurality of control units, means for mounting said control units in adjacent relation in said enclosure with said panels forming the front of said enclosure, a plurality of electrical elements in each control unit behind the panel thereof comprising the elements of a functional circuit for controlling the associated machine component, including a pair of relays and switch means with a manual actuator for said switch means extending from the front of the panel, a multi-terminal receptacle in each unit, conductor means in each unit electrically connecting said electrical elements to individual terminals respectively, of the receptacle thereof, a terminal board mounted in said enclosure, and means including conductors connected to terminals of said terminal board so that selected electrical elements of said control units may be interconnected to form an electrical control circuit by plugging the conductors into said receptacles.

8. For use with a plurality of motion producing elements of a machine, said elements operating in a predetermined sequence involving advance and return motion each machine cycle; said motion producing elements having position responsive means associated therewith operated by the advance and return of each element each machine cycle; a machine control means comprising a plurality of separate interconnected units including a common director unit and individual control units for the motion producing elements, respectively, each control unit having a panel with a panel face, means defining an enclosure for said plurality of control units, means for mounting said control units in adjacent relation with said panel faces in substantially the same plane forming the front panel of said enclosure, means connecting said control units to actuate said elements, respectively, in said predetermined sequence including a terminal board mounted in said enclosure, each said control unit having electrical elements behind the panel thereof including: a switch having an actuator extending from the panel face and contacts actuated by movement of said actuator, a multi-terminal receptacle behind the terminal, a plurality of relays each having multiple contacts carried behind the panel adjacent said receptacle, and conductor means electrically connecting the contacts of said switching relays to individual terminals, respectively, of said receptacle, and conductors connected to terminals of said terminal board and plugged into said receptacles of said control units to contact selected terminals thereof, means connecting said terminals of said terminal board to said elements; means connecting each control unit to position responsive devices operated by the associated element to respond to the return of each element each cycle; means connecting said director unit to said control units via said terminals of said terminal board and receptacles of said control units for initiating each new machine cycle responsive to completion of the return motion of all of said elements in the previous cycle.

9. In combination with a cabinet having a terminal board, a control unit adapted to be removably received in said cabinet and comprising a front plate forming a panel section on one side of said cabinet, a multi-terminal receptacle having separable male and female halves with one of said receptacle halves carried behind said front plate, a plurality of electrical elements mounted behind said front plate between the latter and said one receptacle half, and conductor means electrically connecting said elements to individual terminals of said receptacle half carried by said unit so that conductors connected between said terminal board and the other receptacle half are electrically connected to said electrical elements of said unit by plugging the male half into the female half of said receptacle.

10. A machine control means for a machine having electrically operable motion producing actuators comprising, a plurality of control units each having a panel with a panel face, means defining an enclosure for said plurality of control units, means for mounting said control units in adjacent relation in said enclosure with said panel faces forming the front of said enclosure, a plurality of electrical elements including switching devices in each control unit behind the panel thereof, a multi-terminal receptacle in each unit having a female half and a male half one of which halves is carried behind and spaced from said panel thereof, conductor means in each unit electrically connecting said electrical elements to individual terminals, respectively, of said one half thereof carried in said unit, a terminal board carried by said enclosure, and means including conductors connected to terminals of said terminal board and selected terminals of said other receptacle halves so that said control units and motion producing devices may be interconnected to form a control circuit therefor by plugging the male halves into the female halves of said receptacles.

References Cited in the file of this patent
UNITED STATES PATENTS

| | | |
|---|---|---|
| 2,277,640 | Harrington | Mar. 24, 1942 |
| 2,307,544 | Robinson | Jan. 5, 1943 |
| 2,427,493 | Bullard | Sept. 16, 1947 |
| 2,639,023 | Goodrich | May 19, 1953 |
| 2,719,251 | Stewart | Sept. 27, 1955 |
| 2,794,155 | Jones | May 28, 1957 |
| 2,838,963 | Good et al. | June 17, 1958 |
| 2,874,544 | Switzer | Feb. 24, 1959 |
| 2,882,475 | De Neergaard | Apr. 14, 1959 |
| 2,959,714 | Yarrick | Nov. 8, 1960 |
| 2,988,655 | Rudolph et al. | June 13, 1961 |

FOREIGN PATENTS

| | | |
|---|---|---|
| 978,514 | France | Nov. 29, 1950 |
| 1,175,790 | France | Nov. 17, 1958 |
| 718,812 | Great Britain | Nov. 24, 1954 |